United States Patent
Collins et al.

(10) Patent No.: US 12,209,332 B2
(45) Date of Patent: *Jan. 28, 2025

(54) RELATING TO CARBON FIBRE PROCESSING

(71) Applicant: UNIVERSITY OF LIMERICK, Limerick (IE)

(72) Inventors: Maurice N. Collins, Limerick (IE); Mario Culebras Rubio, Limerick (IE); Patrick Terence McGrail, Limerick (IE)

(73) Assignee: UNIVERSITY OF LIMERICK, Limerick (IE)

( * ) Notice: Subject to any disclaimer, the term of this patent is extended or adjusted under 35 U.S.C. 154(b) by 350 days.

This patent is subject to a terminal disclaimer.

(21) Appl. No.: 17/595,408

(22) PCT Filed: May 15, 2020

(86) PCT No.: PCT/EP2020/063655
§ 371 (c)(1),
(2) Date: Nov. 16, 2021

(87) PCT Pub. No.: WO2020/234168
PCT Pub. Date: Nov. 26, 2020

(65) Prior Publication Data
US 2022/0195631 A1    Jun. 23, 2022

(30) Foreign Application Priority Data
May 17, 2019  (GB) .................................. 1907004

(51) Int. Cl.
*D01F 9/17* (2006.01)
*C01B 32/05* (2017.01)
*C08J 7/04* (2020.01)
*C08L 97/00* (2006.01)

(52) U.S. Cl.
CPC ............... *D01F 9/17* (2013.01); *C01B 32/05* (2017.08); *C08J 7/0427* (2020.01); *C08L 97/005* (2013.01); *C01P 2002/82* (2013.01); *C08J 2397/00* (2013.01); *C08L 2203/12* (2013.01)

(58) Field of Classification Search
CPC .......................................................... D01F 9/17
See application file for complete search history.

(56) References Cited

U.S. PATENT DOCUMENTS

| 7,824,495 B1 | 11/2010 | White et al. |
| 2012/0288434 A1 | 11/2012 | Yang et al. |
| 2020/0248339 A1* | 8/2020 | Atkiss ..................... C01B 32/05 |

FOREIGN PATENT DOCUMENTS

| CN | 101649508 A | | 2/2010 |
| CN | 102181964 | * | 9/2011 |
| CN | 102181964 A | | 9/2011 |
| CN | 104342782 A | | 2/2015 |
| CN | 106517178 A | | 3/2017 |
| DE | 102015205809 A1 | | 10/2016 |
| DE | 102015214218 A1 | | 2/2017 |
| JP | 2011106044 A | | 6/2011 |
| JP | 2011162898 A | | 8/2011 |
| KR | 20180110643 | * | 10/2018 |
| KR | 20180110643 A | | 10/2018 |
| KR | 20180036746 | * | 8/2019 |
| RU | 2343235 C1 | | 1/2009 |
| RU | 2416682 C1 | | 4/2011 |
| RU | 2475571 C1 | | 2/2013 |
| WO | 2017076964 A1 | | 5/2017 |
| WO | 2018078288 A1 | | 5/2018 |

OTHER PUBLICATIONS

Machine translation of document N.*
Machine translation of document N (previously provided Dec. 1, 2023).*
Machine translation of document O (from IDS).*
PCT International Search Report and Written Opinion for International Application No. PCT/EP2020/063655, dated Jul. 27, 2020, 12 pages.
Great Britain Search Report for Application No. GB1907004.4, dated Sep. 30, 2019, 3 pages.

* cited by examiner

*Primary Examiner* — Austin Murata
(74) *Attorney, Agent, or Firm* — Hoffman Warnick LLC

(57) ABSTRACT

Carbon fibre precursors for use in the formation of carbon fibre materials. The carbon fibre precursors comprise fibres of polymeric material which have a coating layer thereon, the coating layer comprising a material susceptible to dielectric heating, for example carbon nanotubes. The carbon fibre precursors may be suitable for forming into carbon fibres using a dielectric heating step, despite the fibres of polymeric material not being susceptible to dielectric heating, without adversely affecting the structure and physical properties of the main body of the carbon fibre so formed. A method of preparing a carbon fibre precursor for a carbon fibre formation process and a method forming a carbon fibre are also disclosed.

14 Claims, 6 Drawing Sheets

TcC-TPU 5 cycles dip-rinse-rinse-dip-rinse-rinse

TcC-TPU 10 cycles dip-rinse-rinse-dip-rinse-rinse

TcC-TPU 20 dip-rinse-dry-dip-rinse-dry

RELATING TO CARBON FIBRE PROCESSING

FIELD

The present invention relates to a carbon fibre precursor, a method of preparing a carbon fibre precursor for a carbon fibre formation process and a method of forming a carbon fibre. In particular the invention relates to carbon fibre precursors which can be carbonized using dielectric heating.

BACKGROUND

Carbon fibres are commonly used for many structural applications such as in the aerospace, military, automobile and wind turbine industries. Currently, the vast majority of carbon fibres are produced by heat treatment and pyrolysis (carbonization) of polyacrylonitrile (PAN) carbon fibre precursors which are synthesised from petroleum sources. There are several disadvantages with this use of PAN as carbon fibre precursors, for example high cost, slow carbonization and the detrimental environmental impact of the acrylonitrile production process.

Lignin may provide a more environmentally benign alternative for carbon fibre production. Lignin is a complex organic polymer present in the cell walls of pith, roots, fruit, buds and bark and, along with hemicellulose and cellulose, is one of the most abundant components of lignocellulosic biomass. However, lignin itself performs poorly during the typical melt spinning process used to form carbon fibre precursors, which makes industrial scale production extremely complicated and difficult. Lignin may also provide carbon fibre precursors of a relatively poor quality, for example such lignin-derived carbon fibre precursors may comprise voids which may adversely affect the physical properties of the carbon fibres produced from such precursors.

A key step in the production of carbon fibres is carbonization. In the carbonization step, carbon fibre precursors are heated to temperatures of 800-3,000° C. (depending on the type of carbon fibre precursor) in the absence of oxygen to expel non-carbon atoms from the carbon fibre precursors. This produces carbon fibre yarns comprising mainly carbon atoms and very few non-carbon atoms. The carbon fibre yarns can then be further processed to facilitate incorporation into products, often as composites with polymeric materials.

The carbonization step in carbon fibre production is particularly energy intensive due to the high temperatures involved. Currently, carbon fibres are carbonized using traditional heating system such as ovens and furnaces which have relatively high energy consumption, which in turn impacts on the environmental profile and the production costs of carbon fibres.

It would therefore be desirable to reduce the energy consumption of carbon fibre production processes, particularly the carbonization step, to reduce the environmental impact of carbon fibres. In particular it may be desirable to make such a reduction in energy consumption in the processing of lignin-based carbon fibre precursors, which as mentioned above are themselves less environmentally impactful than other carbon fibre precursors such as PAN, in order to further reduce the environmental impact of carbon fibre production.

SUMMARY OF THE INVENTION

Figure 1:
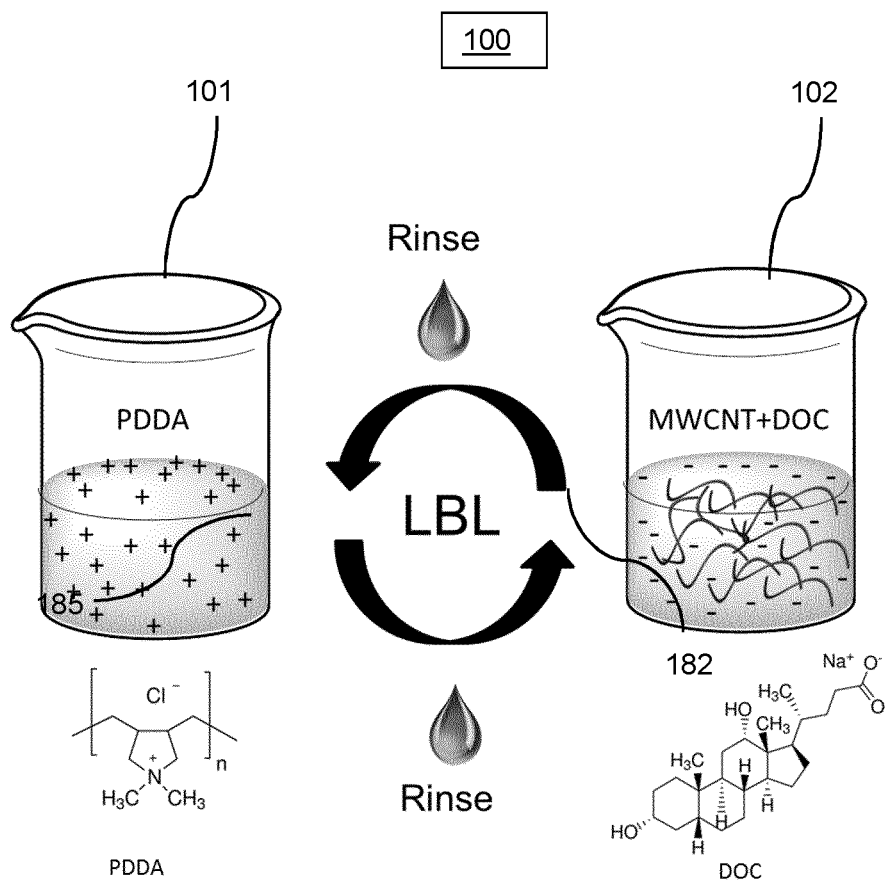
FIG. 1 shows a schematic 100 of a layer-by-layer process for coating fibres of a 60/40 blend of lignin (TCC)/TPU polymer.

It is one aim of the present invention, amongst others, to provide a carbon fibre precursor, a method of preparing a carbon fibre precursor for a carbon fibre formation process and a method of forming a carbon fibre that addresses at least one disadvantage of the prior art, whether identified here or elsewhere, or to provide an alternative to existing methods. For instance it may be an aim of the present invention to provide a carbon fibre precursor which can be carbonized into a carbon fibre using less energy than current carbon fibre precursors.

According to aspects of the present invention, there is provided a carbon fibre precursor and method as set forth in the appended claims. Other features of the invention will be apparent from the dependent claims, and the description which follows.

According to a first aspect of the present invention, there is provided a carbon fibre precursor comprising a fibre of polymeric material and a coating layer on the fibre, the coating layer comprising a dielectric heating susceptor material.

The inventors have found that by incorporating a coating layer containing a dielectric heating susceptor material, the carbon fibre precursors of this first aspect can be carbonized using dielectric heating, such as microwave (MW) and radio frequency (RF) heating which may use less energy than known methods of carbonizing known carbon fibre precursors. The susceptibility of lignin and PAN to dielectric heating is very low and therefore carbonization of such carbon fibre precursors using dielectric heating was found to be ineffective. Providing the coating comprising a dielectric heating susceptor material allows such carbon fibre precursors, for example lignin- and PAN-based carbon fibre precursors, to be effectively carbonized using dielectric heating, without adversely affecting the structure and physical properties of the main body of the carbon fibre (produced from the fibre of polymeric material after carbonization).

The fibre of polymeric material on which the coating is provided may be any suitable carbon fibre precursor fibre material. This fibre is intended to be converted to a carbon fibre during carbonization and any other process step required. The dielectric heating susceptor material, which may provide the advantageous dielectric heating carbonization of the carbon fibre precursor, is located in the coating layer and suitably not in the fibre of polymeric material. The fibre of polymeric material is suitably substantially free of the dielectric heating susceptor material or any other dielectric heating susceptor material. The fibre of polymeric material is suitably unresponsive to dielectric heating, suitably having a dielectric constant of less than 20, suitably less than 10 or less than 5.0.

The inventors have found that providing the dielectric heating susceptor material in the fibre of polymeric material may have the drawbacks of inhomogeneous distribution of the susceptor material and a larger amount of susceptor material being required to have the desired effect. Perhaps most importantly, providing the dielectric heating susceptor material in the fibre of polymeric material may cause defects to form in the carbon fibre produced from the carbon fibre precursor during carbonization, which adversely affects the mechanical properties of said carbon fibre. Therefore the carbon fibre precursors of this first aspect may advantageously use a lower amount of susceptor material than would otherwise be required and may also avoid the structural defects produced by susceptor materials in the fibre of polymeric material, whilst enabling carbonization by dielectric heating with the reduced energy consumption described above.

The fibre of polymeric material may be formed from a synthetic polymer or a biologically derived polymer, or a mixture thereof. Suitable synthetic polymers may be ultimately derived from mineral oil. A suitable synthetic polymer may selected from any one or more of polyacrylonitrile (PAN), nylon, polyethylene terephthalate or a polyester. Suitably the fibre of polymeric material is a PAN fibre. PAN is not sufficiently susceptible to dielectric heating for dielectric heating to be used for carbonizing PAN fibres, without adding dielectric heating susceptor materials.

Suitable biologically derived or "natural" polymers include lignin. Suitably the fibre of polymeric material comprises lignin. It is believed that any type of lignin can be utilised in the fibre of polymeric material, for example lignin obtained from softwood, hardwood or grass/annual plants. Suitable lignin can be obtained from these sources using various known processes, for example the Kraft, organosolve or soda processes. In some embodiments, more than one type and/or source of lignin is used to provide the lignin of the fibre of polymeric material. Lignin is not sufficiently susceptible to dielectric heating for it to be used for carbonizing lignin fibres, without adding dielectric heating susceptor materials.

Suitably the fibre of polymeric material comprises a lignin and at least 10 wt % of a thermoplastic elastomer. Suitably the fibre of polymeric material consists essentially of the lignin and the thermoplastic elastomer. Suitably the fibre of polymeric material consists of the lignin and the thermoplastic elastomer.

The thermoplastic elastomer may be a mixture of thermoplastic elastomer materials or may be a single thermoplastic elastomer material. Suitably the thermoplastic elastomer is a polymeric material. Suitably the fibre of polymeric material does not comprise any other polymeric materials except for the lignin and the thermoplastic elastomer.

Suitably the lignin and the thermoplastic elastomer are thoroughly mixed in the fibre of polymeric material. The fibre of polymeric material may be considered to be a blend of lignin and thermoplastic elastomer.

The inventors have found that the combination of lignin and thermoplastic elastomer provides a composition which has improved properties for processing into a carbon fibre precursor, compared to known compositions comprising only lignin. For example, the composition of lignin and thermoplastic elastomer may be extruded effectively into a fibre which may then be wound onto a bobbin without breaking. It is believed that the thermoplastic elastomer advantageously modifies the mechanical properties of the lignin to increase the normally low tenacity and flexibility of the lignin sufficiently to allow processing into carbon fibre precursors and subsequently into carbon fibres.

Suitably, at least a part of the thermoplastic elastomer comprises functional groups which provide compatibility with lignin. Compatibility with lignin may be determined by the polarity of the polymer and/or functional groups within the polymer. Semi-polar polymers may provide acceptable compatibility with lignin. For example, polyester polyols and polyether polyols may have an appropriate polarity for compatibility with lignin. Said semi-polar polymers may provide parts or segments of the thermoplastic elastomer. Said semi-polar polymers, for example polyester polyols or polyether polyols may provide compatibility with lignin and enable the thermoplastic elastomer to combine with the lignin to provide a fibre of polymeric material with the improved mechanical properties discussed herein.

The inventors have found certain polyurethanes to be particularly advantageous in providing compatibility with lignin and in providing desirable mechanical properties in the fibre of polymeric material, for example polyurethanes comprising (i.e. formed from) polyether polyols or polyester polyols. Thermoplastic polyurethanes formed from a diisocyanate comprising an aryl group and polyether polyols or polyester polyols may be particularly advantageous.

An example of a suitable thermoplastic polyurethane is TPU Pearlthane ECO 12T95 supplied by Lubrizol.

Pearlthane ECO 12T95 is formed from a polyester diol derived from castor oil (to provide soft segments), MDI, dipropylene glycol (minor amount) and 1,4-butanediol (as a "chain extender" providing hard segments on reaction with the MDI).

The fibre of polymeric material may comprise at least 10 wt % of the thermoplastic elastomer and/or mixtures of thermoplastic elastomers. Suitably the fibre of polymeric material comprises at least 20 wt % of the thermoplastic elastomer, suitably at least 25 wt %, suitably at least 30 wt %, suitably at least 35 wt %, suitably at least 40 wt %.

Suitably the fibre of polymeric material comprises up to 60 wt % of the thermoplastic elastomer, suitably up to 55 wt %, suitably up to 50 wt %.

Suitably the fibre of polymeric material comprises from 10 to 60 wt % of the thermoplastic elastomer, suitably from 20 to 60 wt %, suitably from 25 to 55 wt % or from 25 to 50 wt %. Suitably the fibre of polymeric material comprises a crosslinking agent. Said crosslinking agent may provide crosslinks between chains of the lignin or between the chains of thermoplastic elastomer on formation of fibre of polymeric material, for example by reactive extrusion.

The crosslinking agent may be selected from any one or more of isocyanates (for example 4,4'-methylene diphenyl isocyanate) and diglycidyl compounds (for example neopentyl glycol diglycidyl ether). Other suitable chemical species capable of reacting with hydroxyl groups to enable the crosslinking of polymer chains may also be used as said crosslinking agent.

Suitably the fibre of polymeric material is a PAN fibre or a fibre comprising lignin.

The fibre of polymeric material suitably has a thickness of from 1 to 100 μm.

The carbon fibre precursor of this first aspect comprises a coating layer on the fibre which comprises a dielectric heating susceptor material. The coating layer is suitably a substantially uniform coating around the circumference and along the length of the fibre of polymeric material of the carbon fibre precursor. Suitably the coating layer has a thickness of from 5 to 200 nm, suitably from 10 to 150 nm, suitably from 20 to 125 nm or from 25 to 100 nm. The inventors have found that this thickness of a coating comprising a dielectric heating susceptor material is sufficient to heat the fibre of polymeric material during a dielectric heating process to a temperature which carbonizes the fibre to form a carbon fibre. During said dielectric heating process, the coating composition becomes part of the carbon fibre.

Suitably the coating later comprises a polymeric carrier material. Suitably the polymeric carrier material is an ionic polymer. A suitable ionic polymer may be selected from poly(diallyldimethylammonium chloride) (PDDA), poly (styrenesulfonate) (PSS), polyacrylic acid (PAA), poly(allylamine hydrochloride), a carboxymethyl cellulose, an alginate or mixtures thereof.

Suitably the coating layer comprises a surfactant. Suitably the surfactant is compatible with and/or can interact with the polymeric carrier material and the dielectric heating susceptor material, in order to stabilise the dielectric heating susceptor material in the coating on the fibre of polymeric material. Suitably the surfactant is an ionic surfactant. The surfactant may be selected from sodium deoxycholate (DOC), cetrimonium bromide (CTAB), sodium dodecyl sulfate (SDS) or sodium dodecylbenzenesulfonate (SDBS), or mixtures thereof.

Suitably the dielectric heating susceptor material is present in the coating layer in a greater amount than the polymeric carrier material and the surfactant (when present).

Suitably the polymeric carrier material and the surfactant are both ionic. Suitably the polymeric carrier material is cationic and the surfactant is anionic, or the polymeric carrier material is anionic and the surfactant is cationic. This may provide an ionic interaction between the polymeric carrier material and the surfactant which stabilises the coating layer comprising the dielectric heating susceptor material on the fibre of polymeric material.

The coating layer comprises the dielectric heating susceptor material. By dielectric heating susceptor material we mean to refer to a material, for example a particulate material, which absorbs electromagnetic radiation and converts said electromagnetic radiation to heat. For example, the dielectric heating susceptor material may absorb radio frequency radiation and/or microwave radiation and convert said radiation to heat. Suitably the dielectric heating susceptor material absorbs electromagnetic radiation and converts said electromagnetic radiation to heat to a greater extent than the fibre of polymeric material, suitably to a much greater extent. Suitably the dielectric heating susceptor material absorbs electromagnetic radiation and converts said electromagnetic radiation to heat to a sufficient extent to heat and carbonize the carbon fibre precursor of this first aspect to produce carbon fibres.

The dielectric heating susceptor material is suitably selected from any one or more of hollow nanospheres, nanotubes, nanofibres, nanosheets, graphene, graphene derivatives and nano/micro hybrids. The dielectric heating susceptor material may also be nanorods, suitably carbon nanorods. These materials may be alternatively or additionally defined as low dimensional particles, for example particles with at least one nanoscale dimension or component.

Suitably the dielectric heating susceptor material is nanoscale particles. Suitably the dielectric heating susceptor material has a particle size in the range of 50 nm to 1,000 nm (measured by transmission electron microscopy (TEM) using standard techniques).

Suitably the dielectric heating susceptor material is formed of carbon nanotubes.

In the context of the present invention, the term "carbon nanotube" refers to a structure conceptually similar to that made by rolling up a sheet of graphene into a cylinder. Depending on the rolling degree and the way the original graphene sheet is formed, carbon nanotubes of different diameter and internal geometry can be formed. Carbon nanotubes formed by rolling up of a single sheet forming the aforementioned cylinder, are called "single-walled" carbon nanotubes (SWCNTs). The carbon nanotubes formed by rolling up more than one sheet of graphene with a structure that resembles a series of concentric cylinders of increasing diameters from the center to the periphery are called "multi-walled" carbon nanotubes (MWCNTs).

Suitably the dielectric heating susceptor material is formed of multi-walled carbon nanotubes (MWCNTs).

In embodiments wherein the carbon nanotubes are multi-walled carbon nanotubes, the multi-walled carbon nanotubes suitably comprise from 2 to 5 graphitic layers.

The carbon nanotubes suitably have a high aspect ratio (length-to-diameter ratio), suitably an aspect ratio of between 10 and 10,000,000 to 1, suitably between 100 and 10,000,000 to 1. The carbon nanotubes are also suitably highly graphitic.

Suitably the dielectric heating susceptor material provides from 0.01 to 0.1 wt % of the carbon fibre precursor.

Suitably the carbon fibre precursor of this first aspect comprises a fibre of polymeric material and a coating layer on the fibre, the coating layer comprising carbon nanotubes (as a dielectric heating susceptor material) and a surfactant, the coating layer having a thickness of from 10 to 150 nm.

Suitably the carbon fibre precursor of this first aspect comprises a fibre of PAN and a coating layer on the fibre, the coating layer comprising carbon nanotubes (as a dielectric heating susceptor material) and a surfactant, the coating layer having a thickness of from 10 to 150 nm.

Suitably the carbon fibre precursor of this first aspect comprises a fibre of a blend of lignin and a thermoplastic elastomer (for example TPU) and a coating layer on the fibre, the coating layer comprising carbon nanotubes (as a dielectric heating susceptor material) and a surfactant, the coating layer having a thickness of from 10 to 150 nm.

Suitably the carbon fibre precursor of this first aspect comprises a fibre of polymeric material and a coating layer on the fibre, the coating layer comprising carbon nanotubes (as a dielectric heating susceptor material), an ionic surfactant and an ionic polymeric carrier material, the coating layer having a thickness of from 10 to 150 nm.

Suitably the carbon fibre precursor of this first aspect consists essentially of a fibre of polymeric material and a coating layer on the fibre, the coating layer consisting essentially of a dielectric heating susceptor material, a surfactant and a polymeric carrier material, as defined above.

Suitably the carbon fibre precursor of this first aspect consists of a fibre of polymeric material and a coating layer on the fibre, the coating layer consisting of a dielectric heating susceptor material, a surfactant and a polymeric carrier material, as defined above.

According to a second aspect of the present invention, there is provided a method of preparing a carbon fibre precursor for a carbon fibre formation process, the method comprising the steps of:

a) providing a fibre of polymeric material;
b) coating the fibre of polymeric material with a composition comprising a dielectric heating susceptor material.

Suitably the steps of the method of this first aspect are carried in the order step a) followed by step b).

The fibre of polymeric material, dielectric heating susceptor material and carbon fibre precursor produced by the method may have any of the suitable features and advantages described in relation to the first aspect.

Suitably step b) involves the steps of:
i) contacting the fibre of polymeric material with a liquid comprising a polymeric carrier material;
ii) contacting the fibre of polymeric material with a liquid comprising the dielectric heating susceptor material.

Suitably step i) coats the fibre of polymeric material with the polymeric material and step ii) coats the polymeric carrier material with the dielectric heating susceptor material, to form a coating on the fibre of polymeric material comprising both the polymeric carrier material and the dielectric heating susceptor material.

Suitably step b) involves dipping the fibre of polymeric material into a liquid comprising the dielectric heating susceptor material.

Suitably step b) involves the steps of:
i) dipping the fibre of polymeric material into the liquid comprising the polymeric carrier material;
ii) dipping the fibre of polymeric material into the liquid comprising the dielectric heating susceptor material.

The polymeric carrier material may have any of the suitable features and advantages described in relation to the first aspect.

Suitably the liquid of step i) comprises the polymeric carrier material in an amount suitable for applying a coating of the desired thickness onto the fibre of polymeric material. This may depend on the method of application of the liquid to the fibre. Suitably the liquid of step i) comprises 0.1 to 1.0 wt % polymeric carrier material, suitably 0.1 to 0.5 wt % polymeric carrier material, suitably wherein the liquid is applied to the fibre by dipping, suitably wherein the polymeric carrier material is an ionic polymer. Suitably the liquid of step i) is an aqueous liquid.

Suitably the liquid of step ii) comprises the dielectric heating susceptor material in an amount suitable for applying the desired amount of dielectric heating susceptor material onto the fibre of polymeric material. This may depend on the method of application of the liquid to the fibre. Suitably the liquid of step i) comprises 0.001 to 0.1 wt % dielectric heating susceptor material, suitably 0.01 to 0.1 wt % dielectric heating susceptor material, suitably 0.03 to 0.07 wt % suitably wherein the liquid is applied to the fibre by dipping, suitably wherein the dielectric heating susceptor material is MWCNTs. Suitably the liquid of step ii) is an aqueous liquid.

Suitably the steps i) and ii) are repeated at least once.

Steps i) and ii) may be carried out in the order step i) followed by step ii), or in the reverse order. Steps i) and ii) may each be carried out multiple times, either sequentially or alternately. Suitably steps i) and ii) are carried out alternately and are repeated multiple times. Suitably steps i) and ii) are both repeated from 3 to 15 times, suitably from 5 to 12 times, suitably from 5 to 10 times. The inventors have found that repeating the steps i) and ii) in this way may provide an effective coating comprising dielectric heating susceptor material without adversely affecting the carbon fibre precursors, for example by inducing undesirable agglomeration of the carbon fibre precursors.

Suitably after step i) and before step ii) the fibre of polymeric material is rinsed with a solvent. Suitably the solvent is water. Suitably after step ii) and before a repeat of step i) the fibre of polymeric material is rinsed with a solvent. Suitably the solvent is water.

Suitably after step i) and before step ii) the fibre of polymeric material is dried, suitably after being rinsed with a solvent such as water. Suitably after step ii) and before a repeat of step i) the fibre of polymeric material is dried, suitably after being rinsed with a solvent such as water.

Suitably the liquid comprising the dielectric heating susceptor material further comprises a surfactant. The surfactant may have any of the suitable features and advantages described in relation to the first aspect. Suitably the surfactant is present in an amount which provides from 0.1 to 5.0 wt % of the liquid comprising the dielectric heating susceptor material, suitably from 0.1 to 2.0 wt %, suitably from 0.5 to 1.5 wt %, suitably wherein the surfactant is an ionic surfactant.

The method of this second aspect suitably provides a carbon fibre precursor according to the first aspect which is suitable for carbonizing to form a carbon fibre using dielectric heating and therefore may be carbonized in a more energy efficient process than known carbon fibre precursors which require conventional oven or furnace heating.

According to a third aspect of the present invention, there is provided a method of forming a carbon fibre, the method comprising the steps of:
1) preparing a carbon fibre precursor according to a method of the second aspect;
2) exposing the carbon fibre precursor to electromagnetic radiation to heat the carbon fibre precursor to a temperature of at least 800° C. to carbonize the carbon fibre precursor to form the carbon fibre.

The steps of the method are carried out in the order step 1) followed by step 2).

Suitably in step 2) the carbon fibre precursor is heated to a temperature of from 800° C. to 2,000° C., suitably from 800° C. to 1,500° C., suitably from 900° C. to 1,200° C.

Suitably the electromagnetic radiation is microwave frequency radiation or radio frequency radiation. Suitably the electromagnetic radiation is microwave frequency radiation, suitably having a frequency of from 1 to 300 GHz. Suitably step 2) is carried out in a microwave heater, for example a microwave oven, for example having a frequency of microwave radiation of 2.45 GHz and a power output of 700 W. Suitably step 2) is carried using a microwave heater having a power output in the range 100 to 700 W.

Suitably step 2) involves exposing the carbon fibre precursor to microwave frequency radiation for 2 to 60 minutes, suitably 5 to 45 minutes, suitably 10 to 30 minutes, for example approximately 20 minutes.

Suitably step 2) involves exposing the carbon fibre precursor to microwave frequency radiation of frequency 1 to 300 GHz, of power output of 700 W for 2 to 60 minutes, suitably 5 to 45 minutes, suitably 10 to 30 minutes, for example approximately 20 minutes.

According to the present invention, there is provided a carbon fibre precursor and/or a method as described above, and/or with reference to the accompanying drawings.

EXAMPLES

Materials

Fibres of a 60/40 blend of lignin (TCC)/TPU were produced from modified (hydroxy propyl) Kraft hardwood (TCC) with a Mw of 11,357 g/mol obtained from Tecnaro co. (Germany) and the TPU (thermoplastic polyurethane) Pearlthane ECO 12T95 obtained from Veltox (France) (manufactured by Lubrizol). The blended 60/40 lignin (TCC)/TPU was extruded using an Xplore microcompounder MC15 twice, the first time to form pellets and the second time to form fibres to provide the fibres of polymeric material of the carbon fibre precursors of the present invention. In the first extrusion, the pellets were extruded in a counter-rotating mode using a separated heating control at temperatures of 175, 190, 200 and 190° C. to provide pellets with a diameter and/or length of approximately 5 mm. To form the fibres, the pellets were extruded using a single hole die with a diameter of 500 microns at temperatures of 155, 190, 200 and 190° C. This provided fibres having a diameter of from 100 to 200 µm. As they were formed, the fibres were wound onto bobbins using an automatic winder to provide fibres.

Spun PAN fibres were obtained from Dralon.

Multi-walled carbon nanotubes (MWCNTs) "Elicarb" were obtained from Thomas Swan and Co. Ltd.

Poly(diallyldimethylammonium chloride) (PDDA), with a molecular weight of 100,000-200,000 g/mol and sodium deoxycholate (DOC) ($C_{24}H_{39}NaO_4$) were purchased from Sigma Aldrich.

Sample Preparation

Example 1

The 60/40 blend of lignin (TCC)/TPU polymer fibres were coated according to the following layer-by-layer process which is also summarized in schematic 100 of FIG. 1. 0.05 wt % of MWCNTs were dispersed in an aqueous solution comprising 1 wt % DOC to provide suspension 102. The MWCNT/DOC suspension 102 was sonicated for 30 min, followed by 20 min of 15 W tip sonication in an ice water bath, and another 30 min of bath sonication to homogenize. The MWCNT/DOC suspension was then centrifuged at 4000 rpm for 20 min and the supernatant was decanted. The polymer fibres were immersed in a cationic PDDA (0.25 wt) solution 101 for 5 min, followed by rinsing and drying, and then dipped into the anionic MWCNT/DOC suspension 102 for another 5 min. This process results in the deposition on the polymer fibres of a PDDA/MWCNT-DOC bilayer (BL). After the initial BL was deposited, all subsequent layers were deposited with 2 min dip times, with rinsing and drying in between. This cycle was repeated to deposit the desired number of bilayers. Deposited multilayer films were air-dried overnight and then stored in a desiccator prior to further processing or characterization. The Examples summarized in Table 1 are named 1.xy, with the number "x" denoting the number of coating cycles the sample has undergone. The "y" letter in the Example name denotes the sequence of steps involved in each coating cycle (shown in the "procedure" column), with "a" denoting a dip-rinse-rinse-dip-rinse-rinse sequence and "b" denoting a dip-rinse-dry-dip-rinse-dry sequence.

In order to improve the adhesion of the MWCNTs layers, the surface of the fibres can be treated using surface activation techniques such as microwave plasma surface modification, dielectric barrier discharge surface modification or atmospheric pressure jet plasma surface modification. These samples were treated using Dielectric Barrier Discharge (DBD) Plasma Remote in a System SURFX Atomflo 500 (13.56 MHz Tgas 90-110° C.).

TABLE 1

Lignin-TPU/MWCNTs coated samples.

| Sample | Susceptor | Surface modification | Cycles | Procedure |
|---|---|---|---|---|
| Example 1.5a | MWCNTs | Yes | 5 | dip-rinse-rinse-dip-rinse-rinse |
| Example 1.10a | MWCNTs | Yes | 10 | dip-rinse-rinse-dip-rinse-rinse |
| Example 1.5b | MWCNTs | Yes | 5 | dip-rinse-dry-dip-rinse-dry |
| Example 1.10b | MWCNTs | Yes | 10 | dip-rinse-dry-dip-rinse-dry |
| Example 1.20b | MWCNTs | Yes | 20 | dip-rinse-dry-dip-rinse-dry |
| Example 1.30b | MWCNTs | Yes | 30 | dip-rinse-dry-dip-rinse-dry |

Example 2—PAN Coated Samples

PAN polymer fibres were coated with PDDA/MWCNT-DOC bilayers using the same procedure to provide the carbon fibre precursor of Example 2. During each bilayer coating process, the PAN fibers changed their colour to grey due to the presence of MWCNTs. Table 2 summarizes the PAN-based coated carbon fibre precursor examples. These Examples are numbered in the same way as described above for Example 1.

TABLE 2

| Sample | Susceptor | Surface modification | Cycles | Procedure |
|---|---|---|---|---|
| Example 2.5a | MWCNTs | Yes | 5 | dip-rinse-rinse-dip-rinse-rinse |
| Example 2.4a | MWCNTs | Yes | 4 | dip-rinse-rinse-dip-rinse-rinse |
| Example 2.3b | MWCNTs | Yes | 3 | dip-rinse-dry-dip-rinse-dry |
| Example 2.2b | MWCNTs | Yes | 2 | dip-rinse-dry-dip-rinse-dry |
| Example 2.1b | MWCNTs | Yes | 1 | dip-rinse-dry-dip-rinse-dry |

Figure 2:
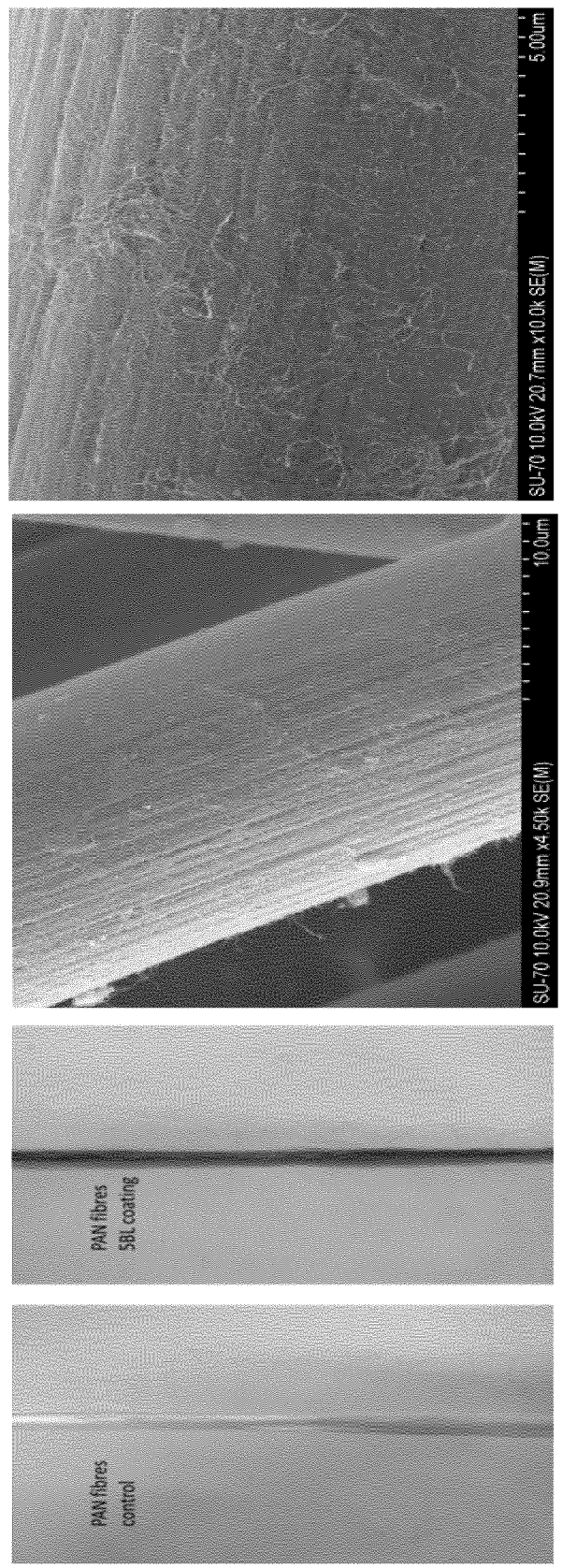
FIG. 2 which shows SEM images of control and PAN fibres coated with 5 cycles of the process of the present invention.

After the coating process, the PAN fibres were not agglomerated—see SEM images of FIG. 2 which show control and PAN fibres coated with 5 cycles of the above process—indicating that the fibres were coated individually and homogeneously, which was desirable for the carbonization process.

Figure 3:
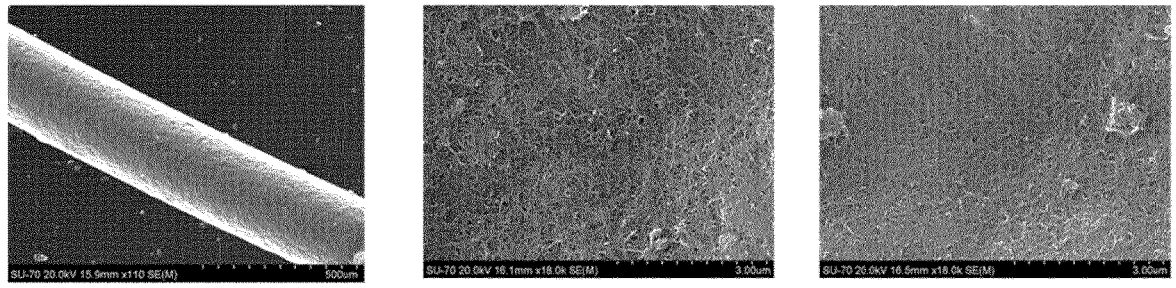
FIG. 3 shows SEM images of lignin-based precursor fibres coated with MWCNTs.
Figure 3:
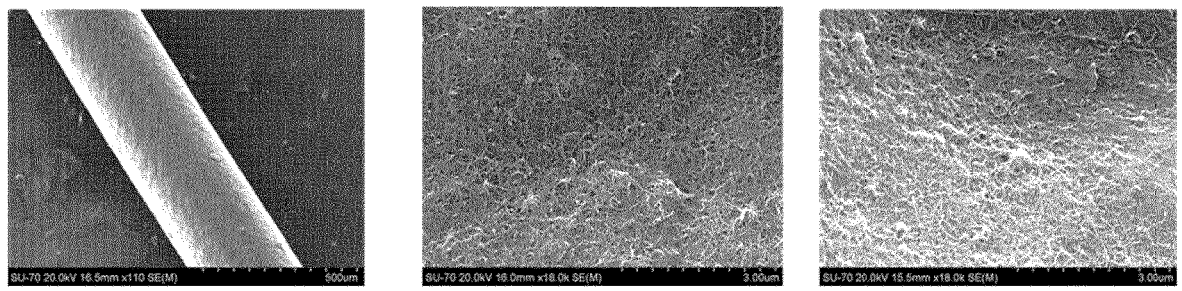
Figure 3:
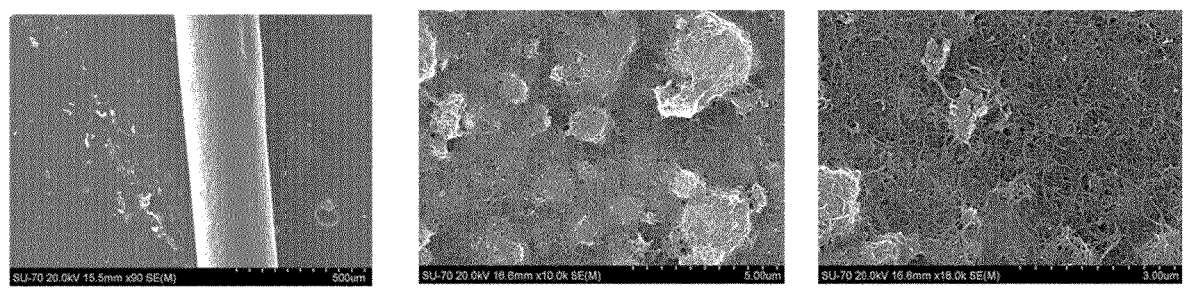

FIG. 3 shows SEM images of Lignin based precursor fibres coated with MWCNTs. The top three images are of Example 1.5a; the middle images are of Example 1.10a; and the bottom images are of Example 1.20b. The SEM images of FIG. 3 show a very homogeneous coating on the surface of the Example 1 lignin-based carbon fibre precursors. Several regions of the fibre were analysed observing the same degree of coating in all of the zones. Where the fibres were coated with 20 cycles (Example 1.20b), the relatively high amount of MWCNTs produced agglomerates, as can be seen in FIG. 3. Therefore, the optimum number of coating cycles, at least for these fibres, may be between 5 and 10.

Figure 4:
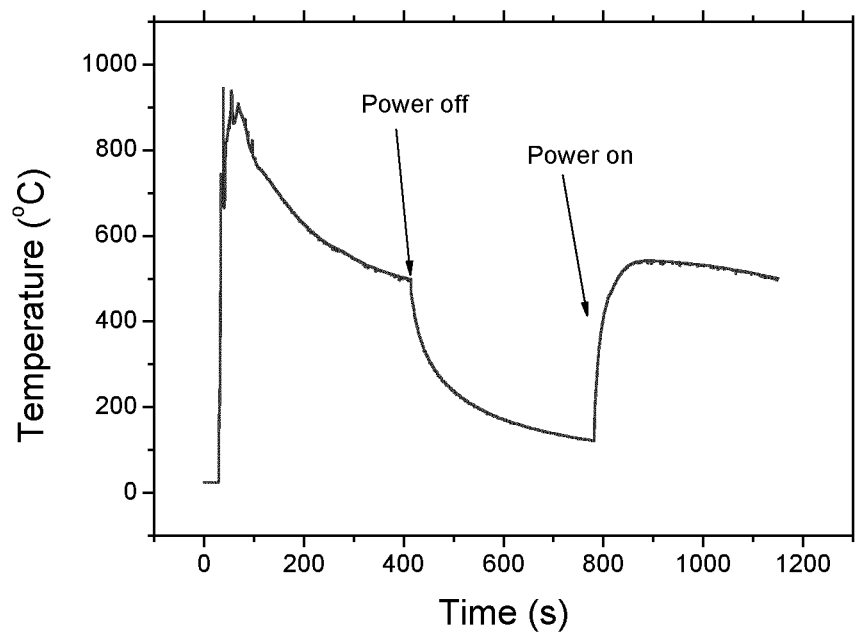
FIG. 4 shows the heating profile of the carbon fibre precursors of Example 2.

FIG. 4 shows the heating profile of the carbon fibre precursors of Example 2.5a under microwave heating using a modified domestic microwave oven with an IR-sensor incorporated for temperature monitoring. This heating profile shows it is possible to reach a temperature of above 900°

C., which is sufficient to carbonize the carbon fibre precursors to produce carbon fibres.

Figure 5:
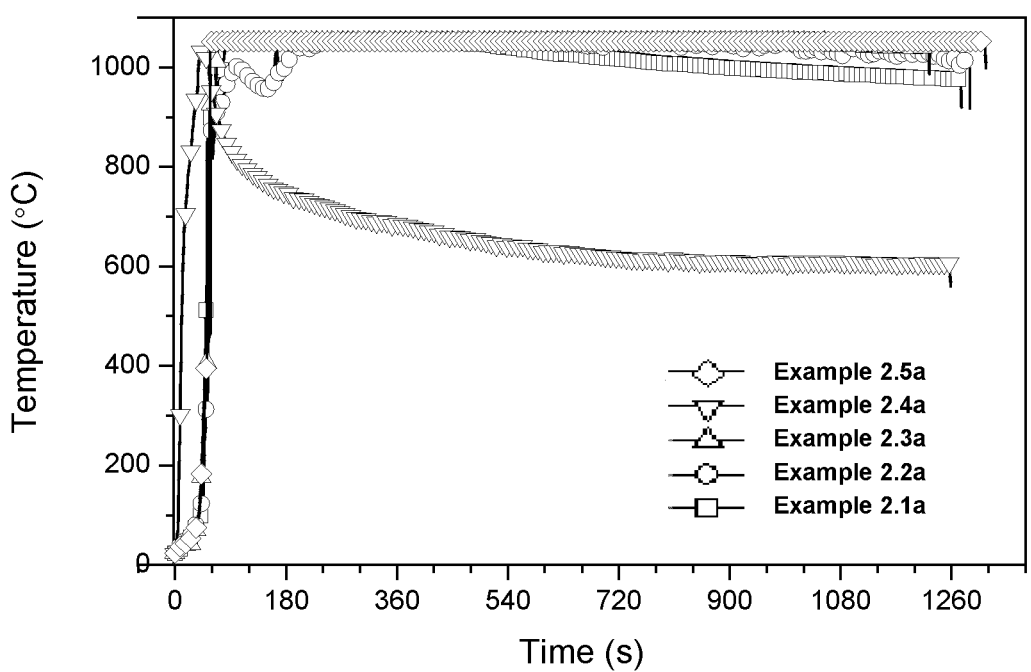
FIG. 5 shows the heating profiles at maximum microwave power of the Examples of Table 2.

FIG. 5 shows the heating profiles at maximum microwave power of the Examples of Table 2. In these heating profiles, the temperature increases until 1000° C. is reached (1000° C. is the limit of the temperature detector). The heating profiles show a rapid increase in the initial phase of heating. However, after a certain amount of time the temperature decreases slowly to below 1000° C. It is possible to observe that the temperature decreases faster when the samples have been coated with a fewer number of cycles. The anomalous behaviour of the sample 4C may be attributed to some experimental errors during sample preparation.

Figure 6:
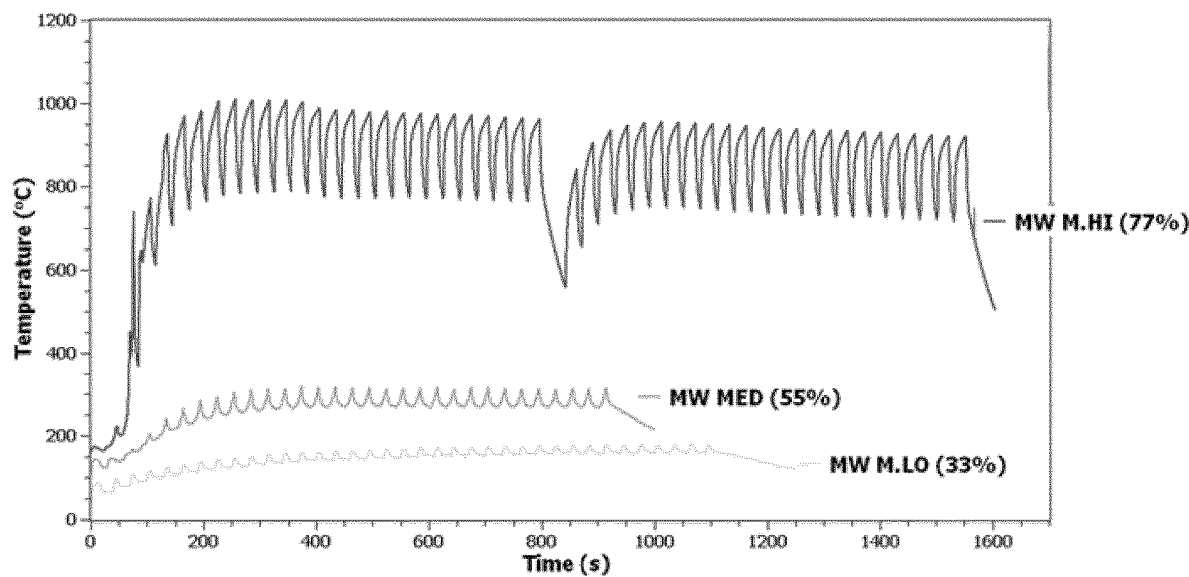
FIG. 6 shows heating profiles of Example 2.5a as a function of MW power.

FIG. 6 shows heating profiles of Example 2.5a as a function of MW power—33%, 55% and 77% of the maximum 700 W power for the medium high, medium and medium low levels, respectively (in the order from top to bottom).

Figure 7:
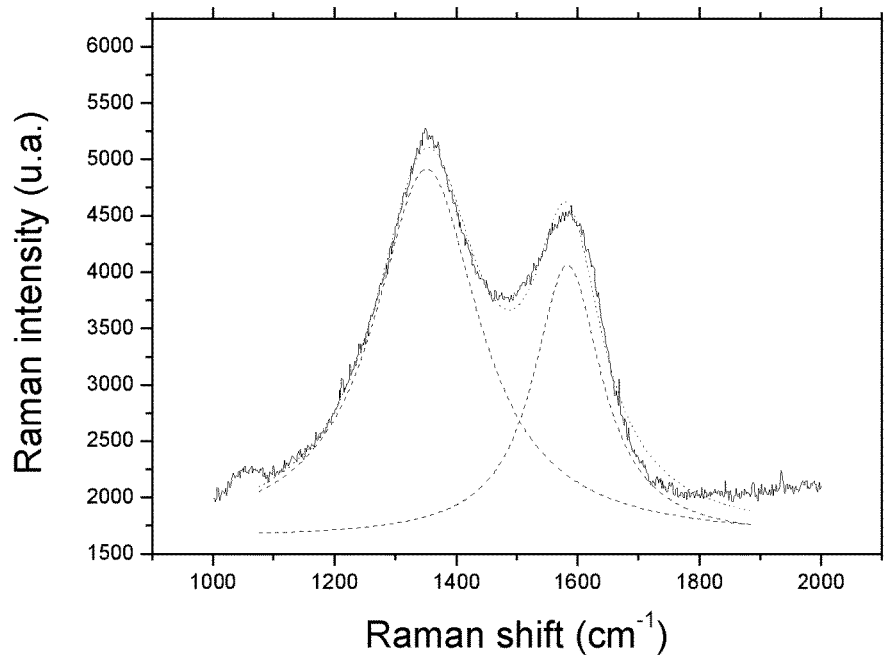
FIG. 7 shows the Raman spectrum of the carbon fibres produced from Example 2.5a after 10 minutes of microwave heating.
Figure 8:
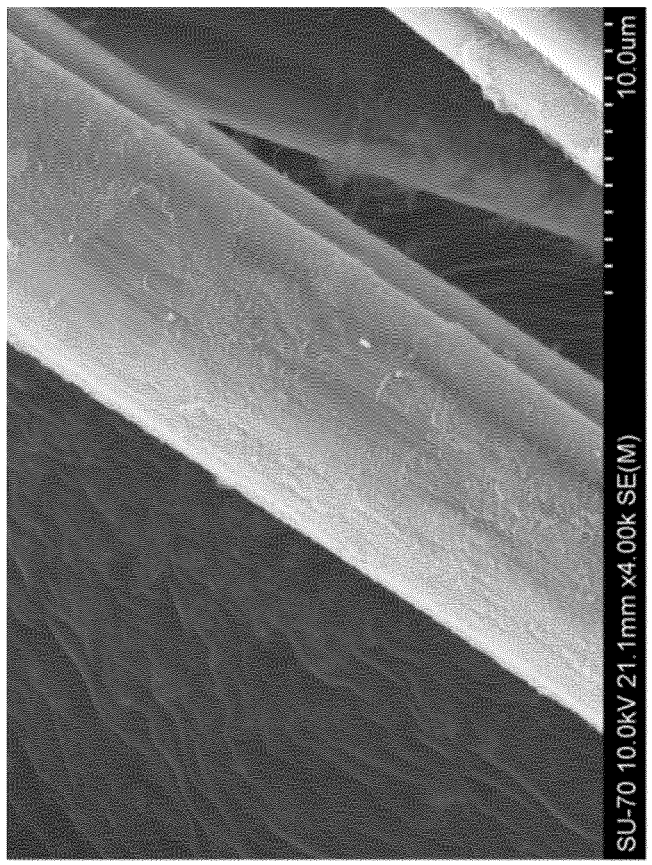
FIG. 8 shows SEM images of the carbon fibres produced from Example 2.5a after 10 minutes of microwave heating.
Figure 8:
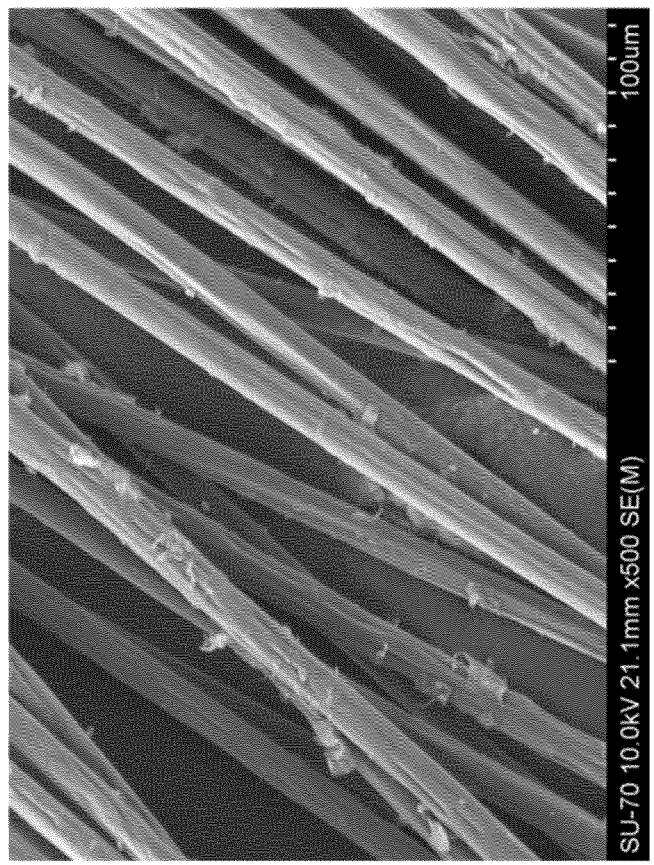

The carbon fibre produced from Example 2.5a as described above (PAN fibres coated with 5 cycles after 10 minutes of microwave heating) was analyzed by Raman in order to assess whether the microwave heating carbonized the polymer fibres of the carbon fibre precursors successfully. FIG. 7 shows the Raman spectrum of the carbon fibres produced from Example 2.5a after 10 minutes of microwave heating. This spectra has the typical features observed for carbon fibres—the D band located at 1351 $cm^{-1}$ and the G band located at 1583 $cm^{-1}$. In addition, SEM images were taken of these carbon fibres. These images, shown in FIG. 8, show that the fibres kept their fibrous shape during carbonization and would therefore be suitable for industrial use.

In summary, the present invention provides carbon fibre precursors for use in the formation of carbon fibre materials. The carbon fibre precursors comprise fibres of polymeric material which have a coating layer thereon, the coating layer comprising a material susceptible to dielectric heating, for example carbon nanotubes. The carbon fibre precursors may be suitable for forming into carbon fibres using a dielectric heating step, despite the fibres of polymeric material not being susceptible to dielectric heating, without adversely affecting the structure and physical properties of the main body of the carbon fibre so formed. A method of preparing a carbon fibre precursor for a carbon fibre formation process and a method forming a carbon fibre are also provided.

Although a few preferred embodiments have been shown and described, it will be appreciated by those skilled in the art that various changes and modifications might be made without departing from the scope of the invention, as defined in the appended claims.

Throughout this specification, the term "comprising" or "comprises" means including the component(s) specified but not to the exclusion of the presence of other components. The term "consisting essentially of" or "consists essentially of" means including the components specified but excluding other components except for materials present as impurities, unavoidable materials present as a result of processes used to provide the components, and components added for a purpose other than achieving the technical effect of the invention. Typically, when referring to compositions, a composition consisting essentially of a set of components will comprise less than 5% by weight, typically less than 3% by weight, more typically less than 1% by weight of non-specified components.

The term "consisting of" or "consists of" means including the components specified but excluding addition of other components.

Whenever appropriate, depending upon the context, the use of the term "comprises" or "comprising" may also be taken to encompass or include the meaning "consists essentially of" or "consisting essentially of", and may also be taken to include the meaning "consists of" or "consisting of".

For the avoidance of doubt, wherein amounts of components in a composition are described in wt %, this means the weight percentage of the specified component in relation to the whole composition referred to. For example, "wherein the liquid comprises 0.1 to 1.0 wt % polymeric carrier material" means that from 0.1 to 1.0 wt % of the liquid is provided by the polymeric carrier material.

The optional features set out herein may be used either individually or in combination with each other where appropriate and particularly in the combinations as set out in the accompanying claims. The optional features for each aspect or exemplary embodiment of the invention as set out herein are also to be read as applicable to any other aspect or exemplary embodiments of the invention, where appropriate. In other words, the skilled person reading this specification should consider the optional features for each exemplary embodiment of the invention as interchangeable and combinable between different exemplary embodiments.

Attention is directed to all papers and documents which are filed concurrently with or previous to this specification in connection with this application and which are open to public inspection with this specification, and the contents of all such papers and documents are incorporated herein by reference.

All of the features disclosed in this specification (including any accompanying claims, and drawings), and/or all of the steps of any method or process so disclosed, may be combined in any combination, except combinations where at least some of such features and/or steps are mutually exclusive.

Each feature disclosed in this specification (including any accompanying claims, and drawings) may be replaced by alternative features serving the same, equivalent or similar purpose, unless expressly stated otherwise. Thus, unless expressly stated otherwise, each feature disclosed is one example only of a generic series of equivalent or similar features.

The invention is not restricted to the details of the foregoing embodiment(s). The invention extends to any novel one, or any novel combination, of the features disclosed in this specification (including any accompanying claims, and drawings), or to any novel one, or any novel combination, of the steps of any method or process so disclosed.

The invention claimed is:

1. A carbon fibre precursor comprising a fibre of polymeric material and a coating layer on the fibre, the coating layer comprising a dielectric heating susceptor material, wherein the fibre of polymeric material comprises a lignin and at least 10 wt % of a thermoplastic elastomer.

2. The carbon fibre precursor according to claim 1, wherein the coating layer has a thickness of from 5 to 200 nm.

3. The carbon fibre precursor according to claim 1, wherein coating layer comprises a surfactant.

4. The carbon fibre precursor according to claim 1, wherein the coating later comprises a polymeric carrier material.

5. The carbon fibre precursor according to claim 1, wherein the dielectric heating susceptor material is formed of carbon nanotubes.

6. The carbon fibre precursor according to claim 1, wherein the dielectric heating susceptor material provides from 0.01 to 0.1 wt % of the carbon fibre precursor.

7. A method of preparing a carbon fibre precursor for a carbon fibre formation process, the method comprising the steps of:
- a) providing a fibre of polymeric material comprising a lignin and at least 10 wt % of a thermoplastic elastomer;
- b) coating the fibre of polymeric material with a composition comprising a dielectric heating susceptor material.

8. The method according to claim 7, wherein step b) involves dipping the fibre of polymeric material into a liquid comprising the dielectric heating susceptor material.

9. The method according to claim 8, wherein step b) involves the steps of:
- i) dipping the fibre of polymeric material into a liquid comprising a polymeric carrier material;
- ii) after step i) dipping the fibre of polymeric material into the liquid comprising the dielectric heating susceptor material.

10. The method according to claim 9, wherein after step i) and before step ii) the fibre of polymeric material is rinsed with a solvent.

11. The method according to claim 9, wherein the steps i) and ii) are repeated at least once.

12. The method according to claim 8, wherein the liquid comprising the dielectric heating susceptor material further comprises a surfactant.

13. The method according to claim 7, further comprising
- c) exposing the carbon fibre precursor to electromagnetic radiation to heat the carbon fibre precursor to a temperature of at least 800° C. to carbonize the carbon fibre precursor to form the carbon fibre.

14. The method according to claim 13, wherein step c) involves exposing the carbon fibre precursor to microwave frequency radiation having a frequency of from 1 to 300 GHz for 2 to 60 minutes.

* * * * *

UNITED STATES PATENT AND TRADEMARK OFFICE
CERTIFICATE OF CORRECTION

| | | |
|---|---|---|
| PATENT NO. | : 12,209,332 B2 | Page 1 of 1 |
| APPLICATION NO. | : 17/595408 | |
| DATED | : January 28, 2025 | |
| INVENTOR(S) | : Collins et al. | |

It is certified that error appears in the above-identified patent and that said Letters Patent is hereby corrected as shown below:

On the Title Page

Item [30], delete "1907004" and insert --1907004.4--

In the Claims

Column 14, Claim 13, Line 12, delete "comprising" and insert --comprising:--

Signed and Sealed this
Twenty-fifth Day of March, 2025

Coke Morgan Stewart
*Acting Director of the United States Patent and Trademark Office*